United States Patent
Sugiyama

(10) Patent No.: US 9,143,656 B2
(45) Date of Patent: Sep. 22, 2015

(54) IMAGE PROCESSING APPARATUS IN WHICH IDENTIFICATION INFORMATION IS READ FROM READING MEDIUM AND PROCESS FOR ALLOWING USER TO USE APPARATUS IF IDENTIFICATION INFORMATION IS REGISTERED

(71) Applicant: Brother Kogyo Kabushiki Kaisha, Nagoya-shi, Aichi-ken (JP)

(72) Inventor: Takashi Sugiyama, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/264,256

(22) Filed: Apr. 29, 2014

(65) Prior Publication Data
US 2014/0320887 A1  Oct. 30, 2014

(30) Foreign Application Priority Data

Apr. 30, 2013  (JP) .................................. 2013-095472

(51) Int. Cl.
*H04N 1/44* (2006.01)

(52) U.S. Cl.
CPC ........... *H04N 1/4413* (2013.01); *H04N 1/4426* (2013.01); *H04N 1/4433* (2013.01)

(58) Field of Classification Search
CPC . G06F 21/608; G06F 17/30126; G06F 21/31; H04N 1/4413
USPC ............ 358/1.14, 1.15; 709/228; 705/51, 52, 705/14.25
See application file for complete search history.

(56) References Cited

U.S. PATENT DOCUMENTS

| | | | |
|---|---|---|---|
| 2005/0152544 A1 | 7/2005 | Kizawa | |
| 2006/0245621 A1* | 11/2006 | Uno | 382/115 |
| 2007/0229909 A1* | 10/2007 | Kitabatake et al. | 358/404 |
| 2009/0015866 A1* | 1/2009 | Iwamoto | 358/1.15 |
| 2011/0173686 A1 | 7/2011 | Ueno et al. | |
| 2012/0192264 A1* | 7/2012 | Sugiyama | 726/16 |
| 2012/0243010 A1* | 9/2012 | Aihara | 358/1.9 |

FOREIGN PATENT DOCUMENTS

| | | |
|---|---|---|
| JP | 2005-198140 A | 7/2005 |
| JP | 2008-033391 A | 2/2008 |
| JP | 2010-086205 A | 4/2010 |
| JP | 2010-108348 A | 5/2010 |
| JP | 2011-128907 A | 6/2011 |
| JP | 2012-014424 A | 1/2012 |
| JP | 2012-164298 A | 8/2012 |

* cited by examiner

Primary Examiner — Jacky X Zheng
(74) Attorney, Agent, or Firm — Banner & Witcoff, Ltd.

(57) ABSTRACT

An image processing apparatus includes an image processing device; a processor configured to control the image processing device; a reading device configured to read identification information on a reading medium and to output the identification information to the processor; and an operation device configured to accept an operation. The processor is configured to perform: a registration process for registering the identification information read by the reading device in a predetermined storage device based on the operation accepted by the operation device; and a login process for making the image processing device available in a case that the identification information read by the reading device has been registered in the storage device.

13 Claims, 9 Drawing Sheets

Fig. 2

| USER ADMINISTRATION TABLE | | | |
|---|---|---|---|
| USER INFORMATION | | | |
| USER ID | PASSWORD | ADMINISTRATIVE RIGHT | CARD ID |
| UserA | 1234 | YES | |
| UserB | 5678 | NO | 29048570 |
| UserC | 3232 | NO | |
| UserD | 8432 | NO | 93279812 |
| UserE | 4321 | NO | 87925891 |
| ... | ... | ... | ... |
| UserN | 2459 | NO | 44593273 |

19

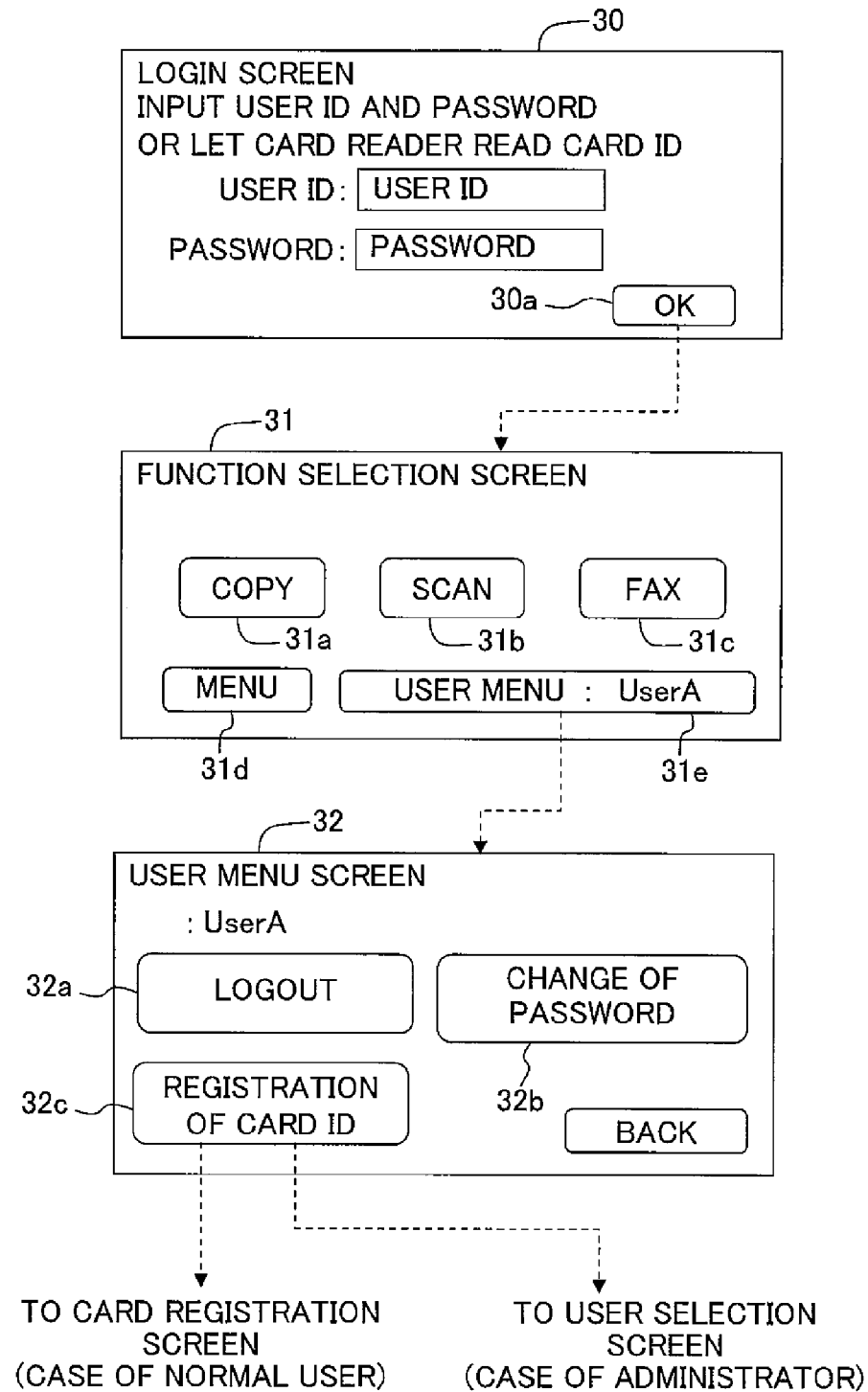

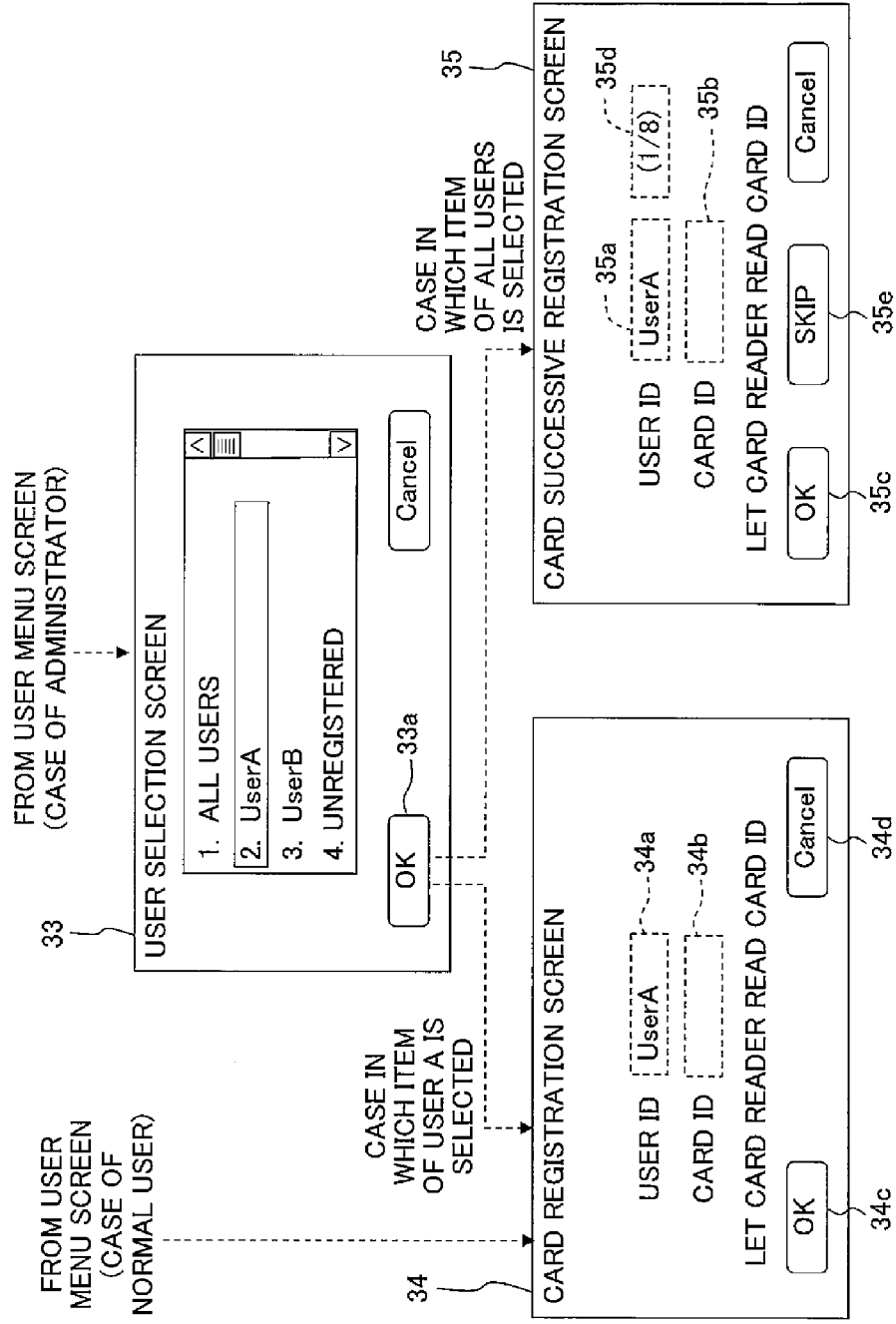

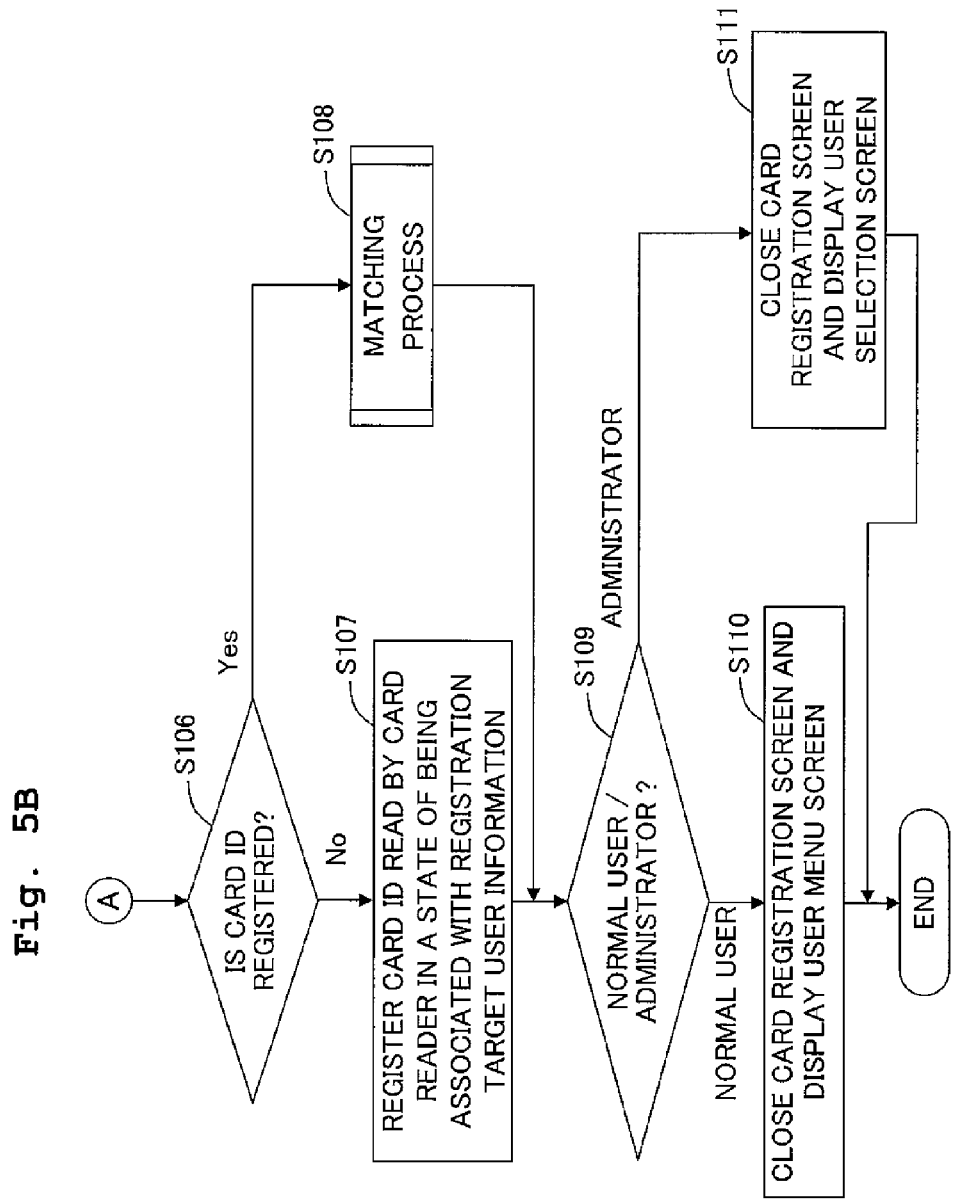

IMAGE PROCESSING APPARATUS IN WHICH IDENTIFICATION INFORMATION IS READ FROM READING MEDIUM AND PROCESS FOR ALLOWING USER TO USE APPARATUS IF IDENTIFICATION INFORMATION IS REGISTERED

CROSS REFERENCE TO RELATED APPLICATION

The present application claims priority from Japanese Patent Application No. 2013-095472, filed on Apr. 30, 2013, the disclosure of which is incorporated herein by reference in its entirety.

BACKGROUND

1. Field of Art

The disclosure relates to a technique in which identification information is read from a reading medium and the identification information is registered in a storage device.

2. Description of the Related Art

There is conventionally known a technique in which a user himself/herself registers card information, in a field of an image forming apparatus which is configured to allow the user to use the image forming apparatus provided that the card information read from an IC card has been registered in the image forming apparatus.

SUMMARY

For example, a user having an administrative right (hereinafter referred to as an administrator) registers a plurality of pieces of card information (referred to as identification information) in some cases. In such a case, according to conventional techniques, there is a problem that the administrator bears a great burden because the administrator has to repeatedly perform an operation, which is needed for each user having no administrative right to register the identification information, by the number of pieces of card information. The present description discloses a technique for reducing the burden on the administrator of when the plurality of pieces of identification information are read from a plurality of reading media and the plurality of pieces of identification information are registered in a storage device.

According to an aspect of the present teaching, there is provided an image processing apparatus, including: an image processing device; a reading device configured to read a piece of identification information from a reading medium; an operation device configured to accept an operation; a processor; and a memory storing computer executable instructions that, when executed by the processor, cause the image processing apparatus to perform: a registration process for registering the identification information read by the reading device in a predetermined storage device based on the operation accepted by the operation device; and a login process for making the image processing device available in a case that the identification information read by the reading device has been registered in the storage device, wherein in the registration process, a sum total of a number of times of operations accepted by the operation device to successively register two or more predetermined number of pieces of identification information is smaller than a value obtained by multiplying a sum total of a number of times of operations accepted by the operation device to register one piece of identification information, by the two or more of predetermined number.

According to the image processing apparatus, the sum total of the number of times of operations accepted by the operation device to successively register two or more predetermined number of pieces of identification information is smaller than a value obtained by multiplying the sum total of the number of times of operations accepted by the operation device to register one piece of identification information, by the two or more of predetermined number. Therefore, it is possible to reduce a burden on an administrator of when the pieces of identification information are read from the plurality of reading media and the pieces of identification information are successively registered in the storage device.

The technique disclosed in the present description can be achieved through various aspects such as an image processing system, an information processing method, and a storage medium storing computer-executable instructions for the image processing apparatus.

BRIEF DESCRIPTION OF THE DRAWINGS

FIG. 2 schematically shows a user administration table.

FIG. 3 schematically shows a user interface of the multifunction machine.

FIG. 4 schematically shows another user interface of the multifunction machine.

FIGS. 5A and 5B show a flowchart showing a process performed when a card ID registration button is selected on a user menu screen or when an OK button is selected in a state that a user ID is selected on a user selection screen.

DESCRIPTION OF ILLUSTRATIVE EMBODIMENTS

Illustrative embodiments of the present teaching will be explained while referring to FIG. 1 to FIG. 7B.

Figure 1:
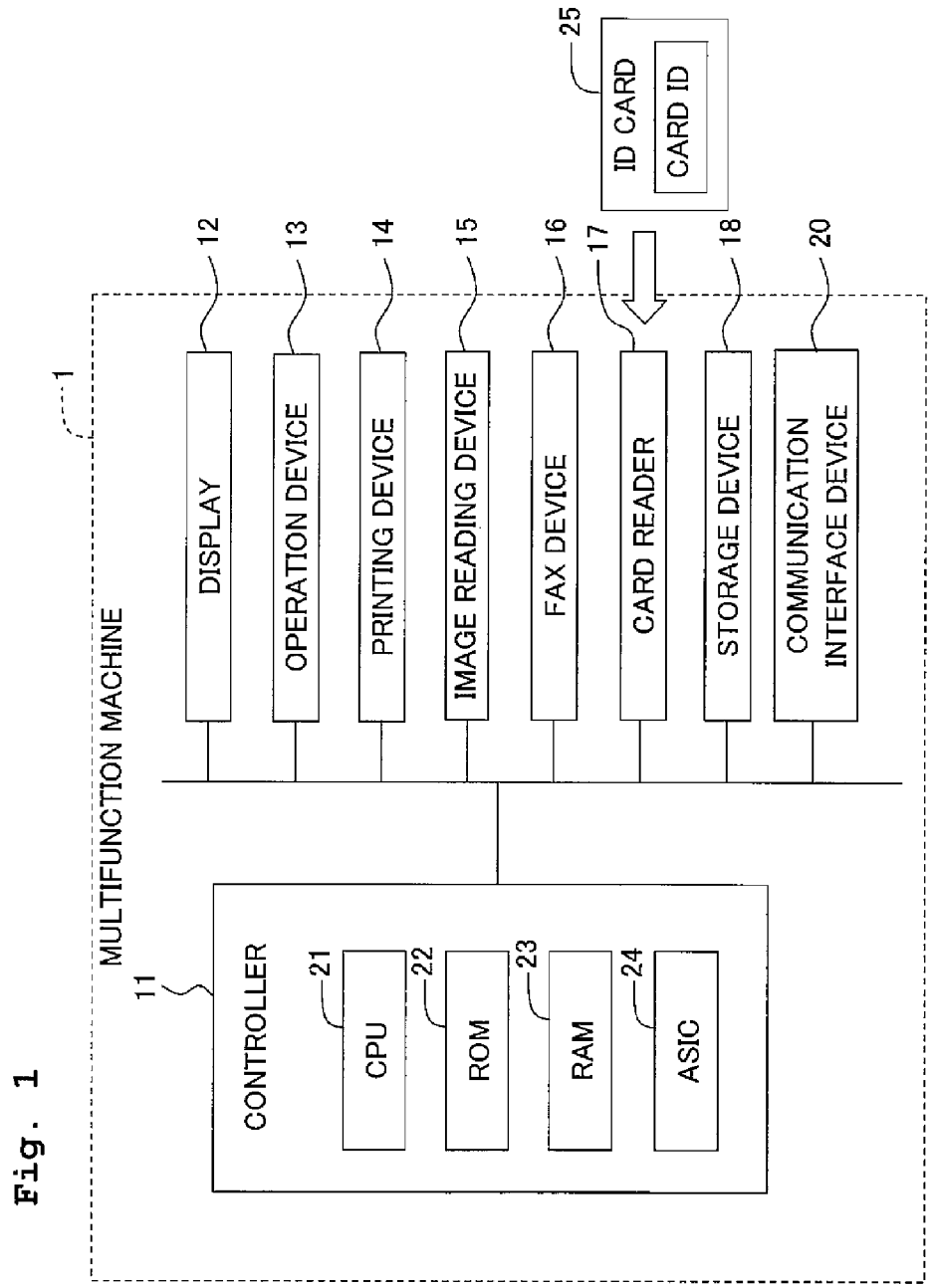
FIG. 1 schematically and simplistically shows an electrical configuration of a multifunction machine.

With reference to FIG. 1, an explanation will be made about an electrical configuration of a multifunction machine 1 as an image processing apparatus. The multifunction machine 1 is an apparatus including a plurality of functions such as a printing function, an image reading function, a copy function, and a facsimile (FAX) function.

The multifunction machine 1 includes a controller 11, a display 12, an operation device 13, a printing device 14, an image reading device 15, a FAX device 16, a card reader 17, a storage device 18, and a communication interface device 20. The controller 11 is configured to include a CPU 21, a ROM 22, a RAM 23, an ASIC 24, and the like. The CPU 21 controls respective devices of the multifunction machine 1 by executing control programs stored in the ROM 22 and/or the storage device 18. The control programs to be executed by the CPU 21, various data, and the like are stored in the ROM 22. The RAM 23 is utilized as a main storage device for performing various processes by the CPU 21.

The display 12 is configured to include a liquid crystal display, a driving circuit for driving the liquid crystal display, and the like. The display 12 is an exemplary reporting device. The operation device 13 is configured to include a touch panel overlaid on the liquid crystal display, a plurality of operation buttons, and the like. The user can input various instructions and a variety of information by operating the operation device 13. The operation device 13 may be configured such that no touch panel is provided and the operation is accepted only through the operation buttons.

The printing device 14 prints images represented by an image data generated by the image reading device 15, an image data received by the FAX device 16, an image data received by the communication interface device 20, and the like, on a sheet such as a printing paper in an electro-photographic type or an ink-jet type. The image reading device 15 is provided with a light source for exposing a document to light, an image sensor, and the like. The image reading device 15 reads the document to generate the image data.

The FAX device 16 performs FAX reception of the image data from an external FAX apparatus via a telephone line. Further, the FAX device 16 performs FAX transmission of the image data generated by the image reading device 15 to the external FAX apparatus. The printing device 14, the image recording device 15, and the FAX device 16 are examples of an image processing device.

The card reader 17 is an apparatus which reads a card ID stored in an ID card 25 in a non-contact manner to output the card ID to the controller 11. The card ID is information for identifying the ID card 25. An explanation will be made by citing an IC card as an example of the ID card 25. When the user holds the ID card 25 over the card reader 17, the card reader 17 can read the card ID in the non-contact manner.

The card ID is an example of identification information. The ID card 25 is an exemplary reading medium. The card reader 17 is an exemplary reading device. The reading device is not limited to one reading the card ID in the non-contact manner. The ID card may be a magnetic card in which the card ID is stored or a card on which the card ID is written with bar code. Those usable as the reading medium include, for example, a USB memory and a removable memory in which the identification information is stored.

The storage device 18 is an apparatus which utilizes a nonvolatile memory such as a hard disk and a flash memory, to store various programs and data. In the storage device 18, a user administration table 19 (see FIG. 2) which will be described later is stored. The storage device 18 is an exemplary storage device. The communication interface device 20 is hardware for connecting the multifunction machine 1 to a communication line such as Local Area Network (LAN) and the Internet.

The user is required to log in to the multifunction machine 1 in order to use the printing device 14, the image reading device 15, and the FAX device 16 of the multifunction machine 1. A method for logging in to the multifunction machine 1 by the user includes the following two methods.

One of the two methods is a method for logging in to the multifunction machine 1 by the input of a user ID and a password. However, the login by use of this method is premised on registration of the user ID and the password in the user administration table 19 in advance. In a case that the user ID and the password are inputted to the multifunction machine 1, the multifunction machine 1 judges whether or not the user ID and the password meet an authentication condition. In a case that they meet the authentication condition, the multifunction machine 1 makes the printing device 14, the image reading device 15, and the FAX device 16 available (login state). On the other hand, in a case that they do not meet the authentication condition, the multifunction machine 1 makes the printing device 14, the image reading device 15, and the FAX device 16 unavailable. In this context, "they meet the authentication condition" means that the combination of the inputted user ID and password has been registered in the user administration table 19.

The other of the two methods is a method for logging in to the multifunction machine 1 by letting the card reader 17 read the card ID. However, the login by use of this method is premised on registration of the card ID in the user administration table 19 in advance.

In a case that the card ID is read by the card reader 17, the multifunction machine 1 judges whether or not the card ID meets an authentication condition. In a case that the card ID meets the authentication condition, the multifunction machine 1 makes the printing device 14, the image reading device 15, and the FAX device 16 available (login state). On the other hand, in a case that the card ID does not meet the authentication condition, the multifunction machine 1 makes the printing device 14, the image reading device 15, and the FAX device 16 unavailable. In this context, "the card ID meets the authentication condition" means that the card ID read by the card reader 17 has been registered in the user administration table 19. The process in which the CPU 21 performs the login authentication by use of the card ID read by the card reader 17 is an exemplary login process.

Subsequently, an explanation will be made about the user administration table 19 stored in the storage device 18 while referring to FIG. 2. In the user administration table 19, the card ID and user information are registered in a state of being associated with each other for each user.

The user information is information including the user ID, the password, and the presence/absence of administrative right. The user ID is an example of user identification information. The presence/absence of administrative right is an example of multiple-registration availability information. In the following description, a user having no administrative right is referred to as a normal user, and a user having the administrative right is referred to as an administrator.

The user information is registered in the user administration table 19 by the administrator, whereas the registration of the card ID is separately performed by the normal user or the administrator after the registration of the user information. The registration of the card ID will be explained later.

The indispensable item for the administrator when registering the user information in the user administration table 19 is only the presence/absence of administrative right. The user ID and the password are allowed to be left blank. Hereinbelow, the user information in which the user ID and the password are left blank is referred to as user information in which no user ID is registered.

For example, in some cases, there is a situation such that, although the number of users using the multifunction machine 1 is supposed to increase, the user ID and the password thereof are not yet determined. In this case, the user information in which no user ID is registered may be registered in the user administration table 19, and then the card ID may be registered in a state of being associated with the user information. The user, of which user ID and password are not registered in the user administration table 19, may log in to the multifunction machine 1 by using the ID card 25 storing the card ID which is registered in a state of being associated with the user information in which no user ID is registered. After logging in to the multifunction machine 1, the user may register the user ID and the password in a user ID registration screen which will be described later.

Subsequently, an explanation will be made about a user interface of the multifunction machine 1 while referring to FIG. 3 and FIG. 4. In a case that no user is logging in to the multifunction machine 1, the CPU 21 waits in a state that a login screen 30 is displayed on the display 12.

In a case that the user inputs the user ID and the password in the login screen 30, the login authentication is performed by using the inputted user ID and password. Or, in a case that the user makes the card reader 17 read the card ID in the state that the login screen 30 is displayed on the display 12, the login authentication is performed by using the card ID read by the card reader 17. In a case that the login authentication succeeds, a function selection screen 31 is displayed on the display 12. The user is capable of using the multifunction machine 1 by the display of the function selection screen 31.

In a case that the user logs in to the multifunction machine 1 by using the ID card 25 storing the card ID, which is registered in a state of being associated with the user information in which no user ID is registered, an unillustrated user ID registration screen for registering the user ID and the password is displayed before the display of the function selection screen 31. In a case that the user inputs the user ID and the password in the user ID registration screen, the inputted user ID and password are registered in the user information associated with the card ID. Accordingly, the user can log in to the multifunction machine 1 from the next time also by a method for logging in to the multifunction machine 1 by the input of the user ID and the password. Therefore, even if the user loses the ID card 25 or forgets to bring the ID card 25, the user is capable of using the multifunction machine 1.

In the function selection screen 31, a copy button 31a, a scan button 31b, a FAX button 31c, a menu button 31d, and a user menu button 31e are displayed. The copy button 31a is a button for using the copy function, the scan button 31b is a button for using the image reading function, and the FAX button 31c is a button for using the FAX function. The menu button 31d is a button for displaying an unillustrated menu screen via which the setting concerning the multifunction machine 1 and the like is made. The user menu button 31e is a button for displaying the user menu screen 32 via which the setting concerning the user is made.

In the user menu screen 32, a logout button 32a, a password change button 32b, and a card ID registration button 32c are displayed. The logout button 32a is a button for logging off the multifunction machine 1. The password change button 32b is a button for displaying an unillustrated password change screen via which the password of a login user who is now logging in to the multifunction machine 1 is changed.

The card ID registration button 32c is a button for selecting a function to register the card ID in a state of being associated with the user information. In a case that the card ID registration button 32c is selected, a screen to be displayed varies depending on whether the login user is the normal user or the administrator. In a case that the login user is the administrator, a user selection screen 33 shown in FIG. 4 is displayed. In a case that the login user is the normal user, a card registration screen 34 shown in FIG. 4 is displayed.

The user selection screen 33 is a screen for selecting the user information to be associated with the card ID. In the user selection screen 33, all of the user IDs registered in the user administration table 19 are listed up. However, as for the user information in which no user ID is registered, the user ID is not yet registered, and thus a string of characters "unregistered" is displayed as the user ID. Further, an item of all users is also displayed in the user selection screen 33. The administrator can select either any user ID or the item of all users in the user selection screen 33.

At first, an explanation will be made about a case in which the user ID is selected. In a case that the administrator selects an OK button 33a in a state that any of the user IDs is selected in the user selection screen 33, the card registration screen 34 is displayed. In the card registration screen 34, a user ID display area 34a is provided. The user ID selected in the user selection screen 33 is displayed in the user ID display area 34a. A card ID display area 34b for displaying the card ID is also provided in the card registration screen 34. In a case that the card ID is already associated with the user information including the selected user ID, the card ID is displayed in the card ID display area 34b.

The administrator may select the item of "unregistered" as the user ID in the user selection screen 33. In a case that the administrator selects the item of "unregistered", the string of characters "unregistered" is displayed in the user ID display area 34a. However, in some cases, the card ID is already associated with even the user information in which no user ID is registered. In such a case, the card ID is displayed in the card ID display area 34b.

As described above, the card registration screen 34 is displayed also when the normal user selects the card ID registration button 32c in the user menu screen 32. In this case, the user ID of the normal user is displayed in the user ID display area 34a. In a case that the card ID is already associated with the user information of the normal user, the card ID is displayed in the card ID display area 34b.

In the card registration screen 34, an instruction "Let card reader read card ID" is displayed. The multifunction machine 1 waits until the card ID is read by the card reader 17 or until the user operates the operation device 13, in a state that the card registration screen 34 is displayed. In a case that the administrator or the normal user makes the card reader 17 read the card ID in the state that the card registration screen 34 is displayed, the card ID is outputted from the card reader 17 to the CPU 21, and the card ID is displayed in the card ID display area 34b. In a case that the card ID is already displayed in the card ID display area 34b, the display of the card ID is updated or overwritten with the card ID read by the card reader 17.

The administrator or the normal user confirms the card ID displayed in the card ID display area 34b, and in a case that the administrator or the normal user registers the card ID, the administrator or the normal user selects the OK button 34c. On the other hand, in a case that the administrator or the normal user does not register the card ID, the administrator or the normal user selects a cancel button 34d. In a case that the administrator or the normal user selects the OK button 34c, the card ID is registered in a state of being associated with a-registration target user information. The registration target user information means user information which includes the user ID displayed in the user ID display area 34a of the card registration screen 34 and which is required to be associated with the card ID read by the card reader 17.

After completion of the registration of the card ID, the card registration screen 34 is closed and a previous screen is displayed again. The previous screen is the user menu screen 32 when the login user is the normal user, and the previous screen is the user selection screen 33 when the login user is the administrator. In this context, the explanation has been made such that the card ID is registered upon the selection of the OK button 34c. However, in a case that the card ID is already associated with the registration target user information, a matching process which will be described later is performed upon the selection of the OK button 34c. In a case that the administrator or the normal user selects not to update the card ID in the matching process, the card ID is not updated.

Subsequently, an explanation will be made about a case in which the item of all users is selected. In a case that the administrator selects the OK button 33a in a state that the item of all users is selected in the user select ion screen 33, a card successive registration screen 35 is displayed. The configuration of the card successive registration screen 35 is approximately the same as that of the card registration screen 34 except for some parts of the card successive registration screen 35. The user information which is registered at the top of the user administration table 19 is automatically selected by the CPU 21 immediately after the card successive registration screen 35 is displayed. The user ID included in the user information is displayed in a user ID display area 35a. In a case that the card ID is already associated with the user information, the card ID is displayed in a card ID display area 35b.

In the card successive registration screen 35, an instruction "Let card reader read card ID" is displayed. The multifunction machine 1 waits until the card ID is read by the card reader 17 or until the user operates the operation device 13, in a state that the card successive registration screen 35 is displayed. In a case that the administrator makes the card reader 17 read the card ID in the state that the card successive registration screen 35 is displayed, the card ID is outputted from the card reader 17 to the CPU 21, and the card ID is displayed in the card ID display area 35b. In a case that the administrator selects the OK button 35c, the card ID is registered in a state of being associated with the registration target user information. Although the matching process is performed in the card successive registration screen 35, an explanation of which will be omitted here.

However, as for the card successive registration screen 35, even when the administrator selects the OK button 35c, the card successive registration screen 35 is not closed. When the administrator selects the OK button 35c in the card successive registration screen 35, the CPU 21 selects a piece of subsequent user information and the user ID of the selected subsequent user information is displayed in the user ID display area 35a. In a case that the card ID is already associated with the selected user information, the card ID is displayed in the card ID display area 35b.

That is, in the card successive registration screen 35, by alternately repeating the operation for reading the ID card 25 with the card reader 17 and the operation for selecting the OK button 35c, the administrator is capable of successively registering the card IDs while associating each of the card IDs with one of a plurality of pieces of user information. In a case that the OK button 35c is selected after all the pieces of user information are selected by the CPU 21, an unillustrated message indicating that all the pieces of user information are selected is displayed and the card successive registration screen 35 is closed. Then, the user selection screen 33 is displayed again.

In the card successive registration screen 35, the user information including no user ID can also be selected. Therefore, the card IDs can be successively registered by the administrator even when the user information including no user ID is selected.

Information 35d expressing (⅛) is displayed on the right side of the user ID in the card successive registration screen 35. The information 35d expressing (⅛) indicates the number of pieces of user information which has been selected up to now and the number of pieces of user information which is registered in the user administration table 19. In particular, the number of pieces of user information which has been selected up to now is "1", and the number of pieces of user information which is registered in the user administration table 19 is "8".

A skip button 35e is also displayed in the card successive registration screen 35. The skip button 35e is a button for skipping the registration of the card ID in the user information which is now selected. Hereinbelow, the skip button 35e will be explained. In a case that the OK button 35c is selected in the card successive registration screen 35, the user information is automatically selected by the CPU 21 and the CPU 21 goes into a state for waiting the card ID being read by the card reader 17. In some cases, the user information which is already associated with the card ID is selected by the CPU 21. When the user information which is already associated with the card ID is selected, the card ID is displayed in the card ID display area 35b. Therefore, the administrator is capable of knowing whether or not the selected user information is already associated with the card ID.

In a case that the selected user information is already associated with the card ID, the administrator is capable of selecting the skip button 35e so as not to associate the card ID with the selected user information. In a case that the skip button 35e is selected, the subsequent user information is selected and the user ID included in the subsequent user information is displayed in the user ID display area 35a. In a case that the selected subsequent user information is already associated with the card ID, the card ID is displayed in the card ID display area 35b.

Even when the selected user information is information which is not yet associated with the card ID, the administrator can select the skip button 35e so as not to associate the selected user information with the card ID, when the selected user information is not required to be associated with the card ID.

The process, in which the CPU 21 displays the login screen 30, the function selection screen 31, the user menu screen 32, the user selection screen 33, the card registration screen 34, and the card successive registration screen 35 to register the card ID read by the card reader 17 in the user administration table 19, is an exemplary registration process.

Subsequently, an ID card registration process executed by the CPU 21 will be explained in detail. The ID card registration process includes "a process performed when the card ID registration button 32c is selected in the user menu screen 32 or when the OK button 33a is selected in a state that the user ID is selected in the user selection screen 33" and "a process performed when the OK button 33a is selected in a state that the item of all users is selected in the user selection screen 33".

Figure 5A:
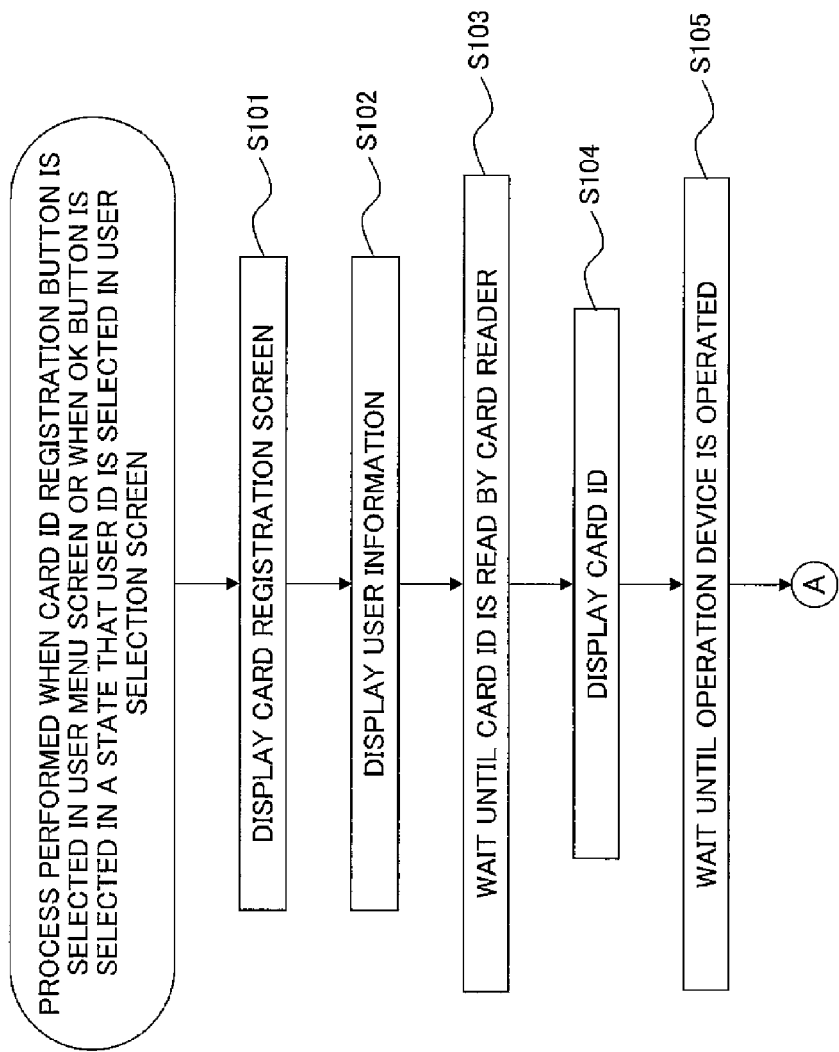

At first, with reference to FIG. 5, an explanation will be made about the process performed when the card ID registration button 32c is selected in the user menu screen 32 or when the OK button 33a is selected in a state that the user ID is selected in the user selection screen 33.

In S101, the CPU 21 displays the card registration screen 34. In S102, the CPU 21 displays the user ID in the user ID display area 34a. In a case that the card ID is already associated with the user information including the displayed user ID, the CPU 21 displays the card ID in the card ID display area 34b. In S103, the CPU 21 waits until the card ID is read by the card reader 17 or until the user operates the operation device 13. In a case that the administrator or the normal user makes the card reader 17 read the card ID in the waiting state so as to output the card ID from the card reader 17, the operation proceeds to S104 by the CPU 21. In S104, the CPU 21 displays the card ID read by the card reader 17 in the card ID display area 34b. In S105, the CPU 21 waits until the user operates the operation device 13. In a case that the OK button 34c is selected in the waiting state, the operation proceeds to S106 by the CPU 21.

In S106, the CPU 21 judges whether or not the card ID is registered in the user administration table 19 in a state of being already associated with the registration target user information. In a case that the card ID is not registered, the operation proceeds to S107 by the CPU 21. In a case that the card ID has been registered, the operation proceeds to S108 by the CPU 21. The process in S106 is an exemplary judgment process. In S107, the CPU 21 registers the card ID read by the card reader 17 in a state that the card ID is associated with the registration target user information.

In S108, the CPU 21 executes the matching process. The explanation of the matching process will be made below. In S109, the CPU 21 judges whether the login user who is now logging in to the multifunction machine 1 is the normal user or the administrator. In a case that the login user is the normal user, the operation proceeds to step S110 by the CPU 21. In a case that the login user is the administrator, the operation proceeds to step S111 by the CPU 21.

In S110, the CPU 21 closes the card registration screen 34 and displays the user menu screen 32. In S111, the CPU 21 closes the card registration screen 34 and displays the user selection screen 33.

Figure 6:
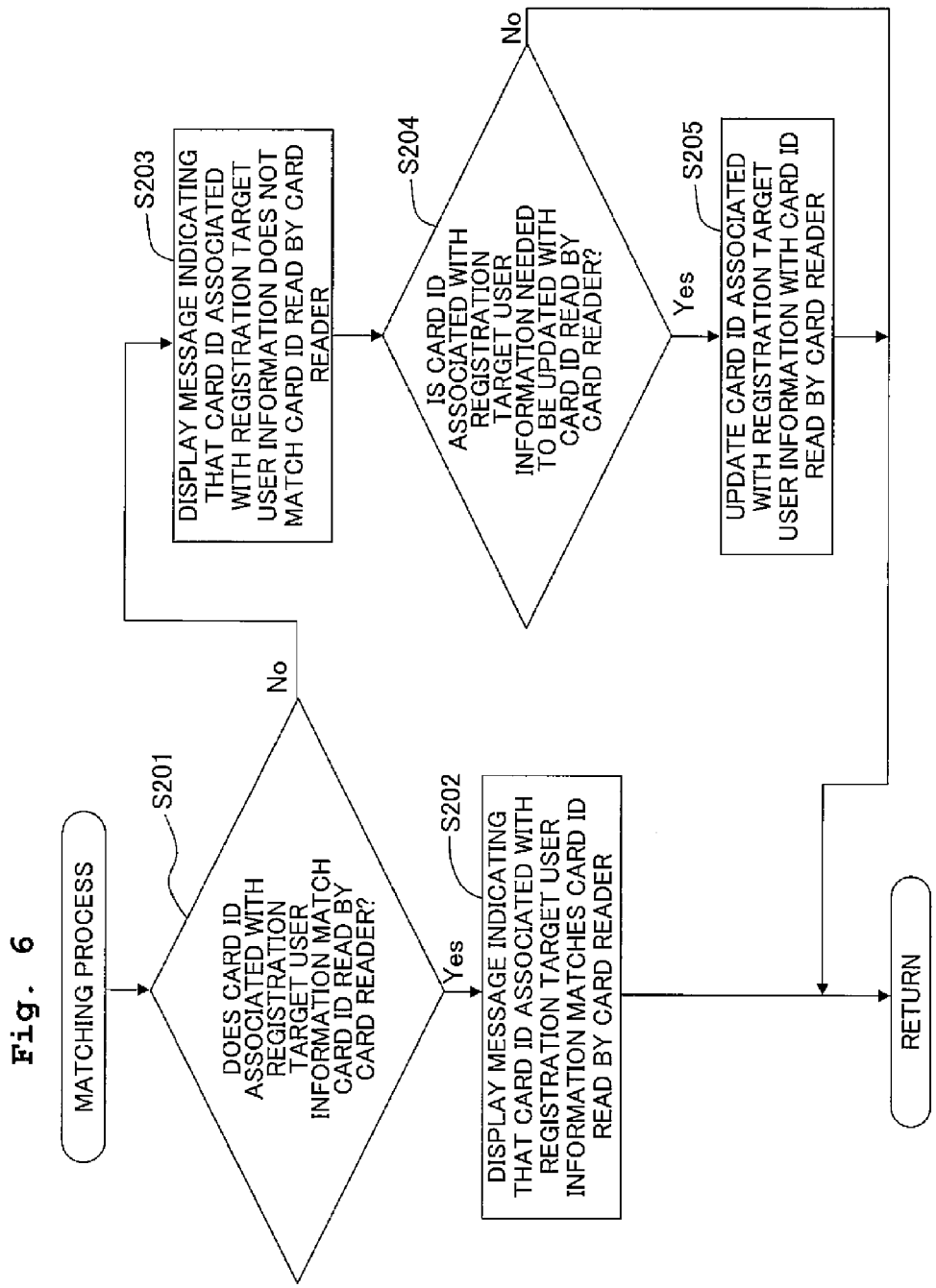
FIG. 6 is a flowchart for a matching process.

Subsequently, with reference to FIG. 6, the matching process executed in S108 will be explained. In S201, the CPU 21 judges whether or not the card ID associated with the registration target user information matches the card ID read by the card reader 17. In a case that the card ID associated with the registration target user information matches the card ID read by the card reader 17, the operation proceeds to S202 by the CPU 21. In a case that the card ID associated with the registration target user information does not match the card ID read by the card reader 17, the operation proceeds to S203 by the CPU 21.

In S202, the CPU 21 displays a message indicating that the card ID associated with the registration target user information matches the card ID read by the card reader 17 on the display 12. In S203, the CPU 21 displays a message indicating that the card ID associated with the registration target user information does not match the card ID read by the card reader 17 on the display 12. The process in S203 is an exemplary reporting process.

In S204, the CPU 21 inquires of the user whether or not the card ID associated with the registration target user information is updated with the card ID read by the card reader 17. In a case that the user selects to perform the update, the operation proceeds to S205 by the CPU 21. In a case that the user does not select to perform the update, the operation proceeds to S109 by the CPU 21. In S205, the CPU 21 updates the card ID associated with the registration target user information with the card ID read by the card reader 17.

Figure 7A:
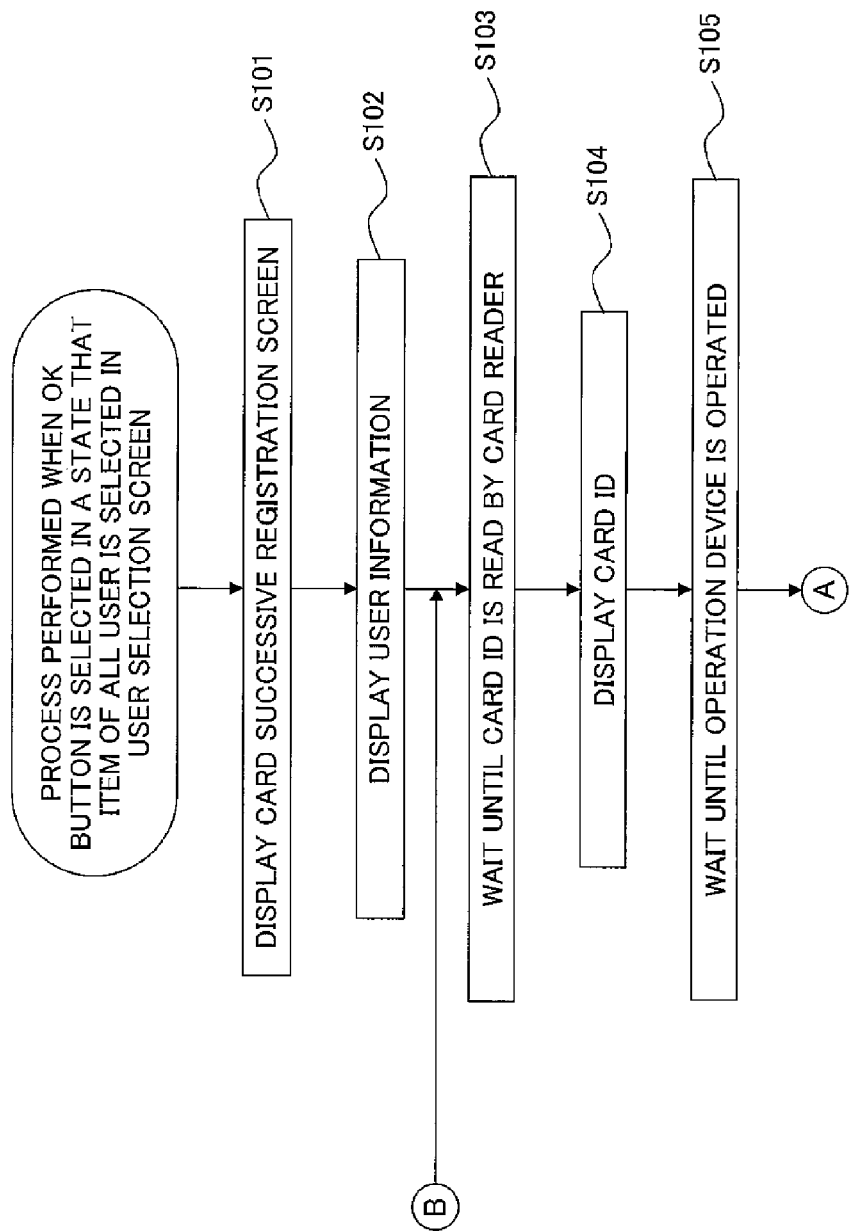
FIGS. 7A and 7B show a flowchart showing a process performed when the OK button is selected in a state that an item of all users is selected on the user selection screen.
Figure 7B:
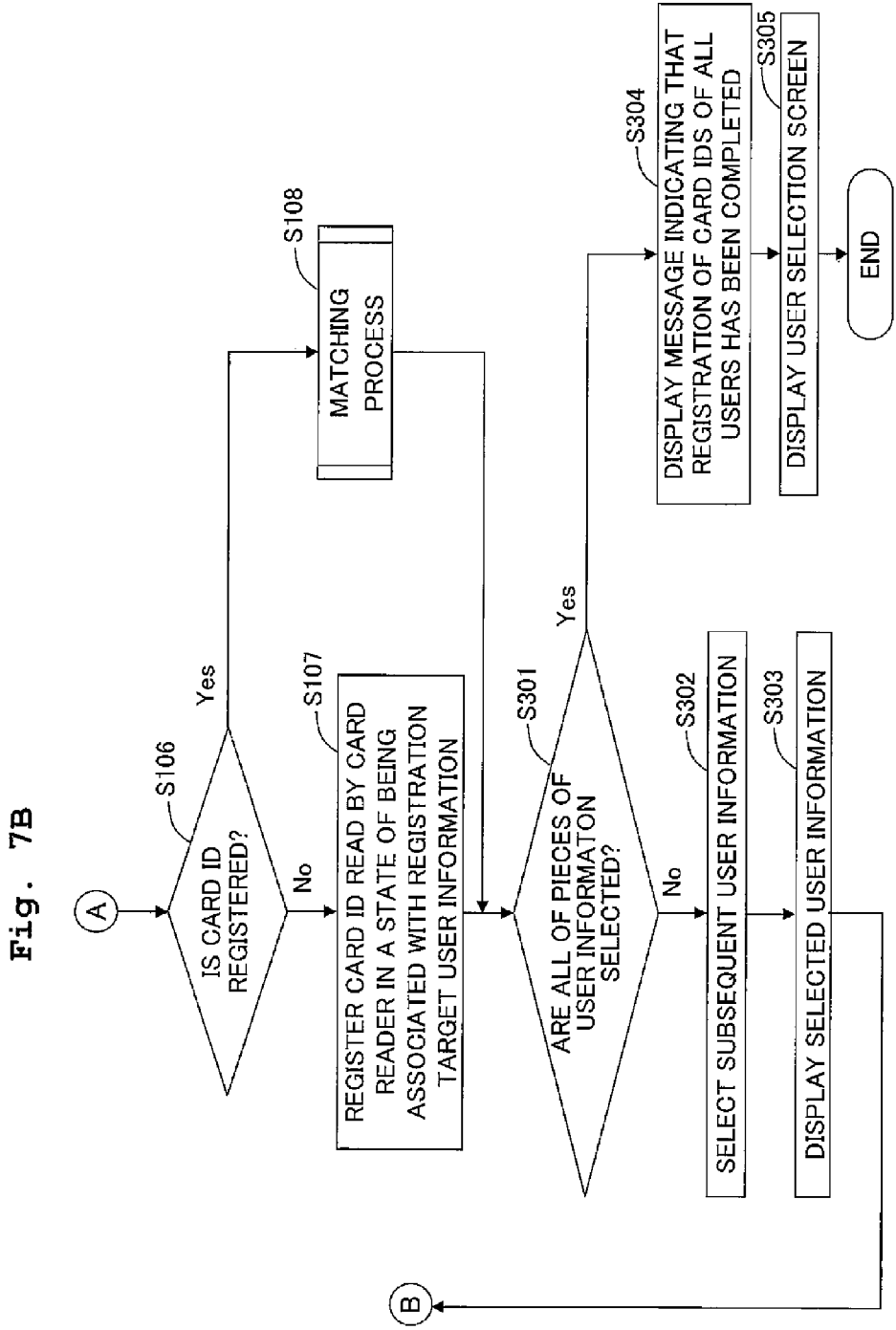

Subsequently, with reference to FIG. 7, an explanation will be made about the process performed when the OK button 33*a* is selected in a state that the item of all users is selected in the user selection screen 33.

The processes of S101 to S108 are substantially the same as those of the "process performed when the card ID registration button 32*c* is selected in the user menu screen 32 or when the OK button 33*a* is selected in a state that the user ID is selected in the user selection screen 33" except that the card successive registration screen 35 is displayed instead of the card registration screen 34, and thus any explanation of which will be omitted.

In S301, the CPU 21 judges whether or not all of pieces of user information registered in the user administration table 19 are selected. In a case that the CPU 21 judges that there is user information which is not yet selected, the operation proceeds to S302 by the CPU 21. In a case that the CPU 21 judges that all of pieces of user information are selected, the operation proceeds to S304 by the CPU 21.

In S302, the CPU 21 selects a piece of subsequent user information from among the plurality of user information in the user administration table 19. In S303, the CPU 21 displays the user ID included in the user information selected in S302 in the card successive registration screen 35. In a case that the card ID is already associated with the user information, the CPU 21 also displays the card ID. Then, the operation returns to S103 by the CPU 21. In S304, the CPU 21 displays a message indicating that the registration of the card IDs of all users has been completed on the display 12. In S305, the CPU 21 displays the user selection screen 33.

For example, the following five operations are required for a registration process in which the normal user registers the card ID by himself or herself. Since the user information of the normal user is registered in a state of not being associated with the card ID at this stage, the user can not log in to the multifunction machine 1 by letting the card reader 17 read the card ID.

(a1) Operation for inputting the user ID and the password in the login screen 30

(a2) Operation for selecting the OK button 30*a* in the login screen 30

(a3) Operation for selecting the user menu button 31*e* in the function selection screen 31

(a4) Operation for selecting the card ID registration button 32*c* in the user menu screen 32

(a5) Operation for selecting the OK button 34*c* in the card registration screen 34

Accordingly, for example, in a case that the administrator attempts to register the card IDs of ten ID cards 25 by performing the above five operations instead of each of ten normal users, the number of times of operations is 50 (=5× 10).

On the other hand, the following seven operations are required for a registration process in which the administrator selects and registers one user ID in the user selection screen 33. In a case that the administrator logs in to the multifunction machine 1 by use of his/her own ID card 25, (b1) and (b2) described below are unnecessary.

(b1) Operation for inputting the user ID and the password in the login screen 30

(b2) Operation for selecting the OK button 30*a* in the login screen 30

(b3) Operation for selecting the user menu button 31*e* in the function selection screen 31

(b4) Operation for selecting the card ID registration button 32*c* in the user menu screen 32

(b5) Operation for selecting the user ID in the user selection screen 33

(b6) Operation for selecting the OK button 33*a* in the user selection screen 33

(b7) Operation for selecting the OK button 34*c* in the card registration screen 34

In a case that the administrator selects the OK button 34*c* in the card registration screen 34, the user selection screen 33 is displayed again. Thus, after registering the first card ID, only the three operations from (b5) to (b7) are required to be repeated for subsequent card IDs. Therefore, for example, the number of times of operations required for the registration process for registering the card IDs of ten ID cards 25 is 34 in total, which is provided by adding the number of times of operations for registering the first card ID (7 times) to the number of times of operations for registering the card IDs subsequent to the first card ID (27 times, =3×9). The value of 34 is smaller than a value (=50) obtained by multiplying the number of times of operations (=5) accepted by the operation device 13 when only one card ID is registered, by the number of card IDs (=10).

In the above description, the case in which the administrator selects and registers the user IDs one by one in the user selection screen 33 has been explained. The administrator, however, is capable of selecting the item of all users in the user selection screen 33. In a case that the item of all users is selected, the description of (b5) can be replaced with the "operation for selecting the item of all users in the user selection screen 33", and the description of (b7) can be replaced with the "operation for selecting the OK button 35c in the card successive registration screen 35". In a case of selecting the item of all users, each of the operations including (b1) to (b6) is required to be performed once and the operation of (b7) is required to be performed 10 times, that is, the number of times of operations required for the registration is 16 in total (<50). Accordingly, in the case of selecting the item of all users, it is possible to further reduce the number of times of operations.

As described above, according to the multifunction machine 1 of the present teaching, in a case that the administrator registers the card IDs stored in respective ID cards 25 in the user administration table 19 by letting the card reader 17 read the card IDs, it is possible to reduce the number of times of operations as compared with a case in which the administrator attempts to register a plurality of number of card IDs by repeating the operations, which are needed for each of the normal users to register the card ID by himself or herself, the plurality of number of times. Accordingly, the burden on the administrator at the time of registration of the plurality of card IDs can be reduced.

According to the multifunction machine 1, the card ID can be registered in a state of being associated with the user information.

According to the multifunction machine 1, the user ID is displayed on the card registration screen 34 or the user successive registration screen 35, and thus the user is capable of confirming the user ID to be associated with the card ID.

According to the multifunction machine 1, in a case that the skip button 35e is selected in the user successive registration screen 35, the card ID is not associated with the user information which is now selected, and the subsequent user information is selected. When the card IDs are registered, the burden on the user can be reduced by causing the CPU 21 to select the user information. However, when the user information is selected by the CPU 21, the user information which is not required to be associated with the card ID is also selected by the CPU 21. According to the multifunction machine 1, when the user information which is not required to be associated with the card ID is displayed, the administrator can select the skip button 35e, so that the card ID is not associated with the user information which is not required to be associated with the card ID.

According to the multifunction machine 1, the user information includes an item for the user ID, and the user information including no user ID is also selected by the CPU 21. Thus, the card ID can be associated also with the user information including no user ID.

According to the multifunction machine 1, in a case that the card ID is already associated with the selected user information, the CPU 21 matches the card ID associated with the selected user information against the card ID read by the card reader 17. Thus, in a case that the card ID associated with the selected user information does not match the card ID read by the card reader 17, the user is capable of knowing that.

According to the multifunction machine 1, the presence/absence of administrative right is registered in the user administration table 19, and only the user having the administrative right is allowed to register the card IDs. Thus, it is possible to suppress unrightful registration of the card IDs by the user having no administrative right.

The present teaching is not limited to the illustrative embodiment explained by the above description and the drawings. For example, the following illustrative embodiments are included in the technical scope of the present teaching.

The above illustrative embodiment has been explained with the example in which the CPU 21 waits a subsequent card ID read by the card reader 17 when the operation for selecting the OK button 35c is accepted in the card successive registration screen 35 after the card ID is read by the card reader 17. The present teaching, however, may be configured such that the CPU 21 waits the subsequent card ID read by the card reader 17 without accepting the operation for selecting the OK button 35c after the card ID is read by the card reader 17.

In particular, after the card ID is read by the card reader 17 in S103 and the process in S104 is executed, the operation may proceed to S106 by the CPU 21 without accepting the operation for selecting the OK button 35c in S105. According to this configuration, in a case that the card IDs are successively registered in a state of being associated with the plurality of pieces of user information in the card successive registration screen 35, the administrator may not perform the operation for selecting the OK button 35c every time the administrator makes the card reader 17 read a card ID. In other words, the administrator has only to let the card reader 17 read card IDs one after another. Accordingly, the burden on the administrator at the time of registration of the plurality of card IDs can be reduced.

In the above illustrative embodiment, in a case that the CPU 21 selects the user information in the card successive registration screen 35, the CPU 21 also selects the user information which is already associated with the card ID. However, the user information which is already associated with the card ID may not be selected by the CPU 21. Accordingly, it is possible to prevent that another card ID is associated with the user information which is already associated with the card ID.

In a case that the multifunction machine 1 is configured so that the user information which is already associated with the card ID is not selected, the user information selected by the CPU 21 is supposedly not yet to be associated with the card ID. Thus, in such a case, the process in S106 is unnecessary in the process performed when the OK button 33a is selected in a state that the item of all users is selected in the user selection screen 33, and the operation proceeds to S107 at all times.

The above illustrative embodiment has been explained with the example as follows. That is, it is judged whether or not the card ID is registered in a state of being already associated with the registration target user information (S106), and the matching process is performed when the card ID has been registered. However, the operation may proceed to S107 at all times without executing the process in S106. In such a case, the card ID which is already associated with the user information is always updated with the card ID read by the card reader 17.

The above illustrative embodiment has been explained with the example in which the user information including no user ID can be registered in the user administration table 19. However, it may be configured that the user information including no user ID can not be registered in the user administration table 19.

The above illustrative embodiment has been explained with the example in which the method for logging in to the multifunction machine 1 includes two methods. The method for logging in to the multifunction machine 1, however, may include only the login method performed by letting the card reader 17 read the card ID. In this case, only the card ID is registered in the user administration table 19. Even when the method for logging in to the multifunction machine 1 includes only the login method performed by letting the card reader 17 read the card ID, the user information may be registered in the user administration table 19. This is because it is possible to know as to which ID card 25 is utilized by which one of the users.

The above illustrative embodiment has been explained with the example in which the card ID can be registered also by the normal user. However, it may be configured that the card ID can not be registered by the normal user.

The above illustrative embodiment has been explained with the example in which the user administration table 19 is stored in the storage device 18 provided for the multifunction machine 1. However, the user administration table 19 may be stored in an external server connectable with the multifunction machine 1 via the communication interface device 20. In such a case, the external server is an example of the storage device. In a case that the administration table 19 is stored in the external server, the multifunction machine 1 may be configured as follows. That is, the multifunction machine 1 transmits the user ID and password or the card ID to the external server via the communication interface device 20 to request the authentication, and the multifunction machine 1 judges whether or not to go into a login state based on the authentication result received from the external server.

The above illustrative embodiment has been explained with the example in which the information is reported to the user by displaying various messages on the display 12. However, the information may be reported, for example, through voice or audio.

The above illustrative embodiment has been explained with the example in which each of the processes is executed by the CPU 21. However, some of the processes may be executed by the ASIC 24. Or, the controller 11 may not include the ASIC 24. Alternatively, the controller 11 may include a plurality of CPUs so that the processes are shared and executed by the CPUs.

The above illustrative embodiment has been explained with the example in which the multifunction machine 1 is used as the image processing apparatus. The image processing apparatus, however, may be a printing apparatus, an image reading apparatus, and a FAX apparatus, each of which has a single function.

The above illustrative embodiment has been explained by citing the image processing apparatus as an example. However, the technique disclosed in the present description may be configured as an image processing system. In particular, the technique disclosed in the present description may be configured as an image processing system which is provided with the image processing apparatus, the card reader 17, and the storage device so that the card reader 17 and the storage device 18 are externally connected with the image processing apparatus. In such a case, the card reader 17 is an exemplary reading apparatus and the storage device 18 is an exemplary storage device. Only one of the card reader 17 and the storage device 18 may be externally connected with the image processing apparatus.

What is claimed is:

1. An image processing apparatus, comprising:
    an image processing device;
    a reading device configured to read identification information from an ID card;
    an operation device configured to accept an operation;
    a display unit configured to display information;
    a storage device configured to store a plurality of records, each record including a piece of user information;
    a processor; and
    a memory storing computer executable instructions that, when executed by the processor, cause the image processing apparatus to perform:
        a login process for making the image processing device available in a case that the identification information read by the reading device has been registered in the storage device, and
        a registration process for registering the identification information read from the ID card by the reading device in the storage device, comprising:
            retrieving one record including one piece of user information, for which the registration process has not been performed, from the storage device and displaying the one piece of user information on the display unit;
            in a case that the processor receives the identification information read from the ID card via the reading device while displaying the one piece of user information included in the one record on the display unit, registering the identification information read from the ID card into the one record in association with the one piece of user information displayed on the display unit;
            while the storage device stores another record including another piece of user information for which the registration process has not been performed, continuing the registration process for a remaining piece of user information for which the registration process has not been performed; and
            in a case that the storage device does not store another record including another piece of user information for which the registration process has not been performed, terminating the registration process.

2. The image processing apparatus according to claim 1, wherein in a case that two or more predetermined number of pieces of identification information are to be registered in the registration process, the operation device is configured not to accept the operation after the processor registers the identification information read by the reading device in the storage device and until another piece of identification information is read by the reading device.

3. The image processing apparatus according to claim 1, wherein the operation device is configured to accept a skip operation during the registration process for skipping a process for associating the piece of user information displayed on the display with the identification information read by the reading device in a state that the piece of user information retrieved by the processor is displayed on the display, and
    in the registration process, the processor is configured to retrieve a next piece of user information without associating the piece of user information, which is retrieved by the processor and displayed on the display, with the identification information read by the reading device, in a case that the skipping operation is accepted by the operation device.

4. The image processing apparatus according to claim 1, wherein each of the pieces of user information includes an item for a piece of user identification information, and
    in the registration process, the processor is configured to also retrieve a piece of user information which has no user identification information in the item.

5. The image processing apparatus according to claim 1, wherein in the registration process, the processor is configured to retrieve only a piece of user information with which no identification information is associated.

6. The image processing apparatus according to claim 1, further comprising a reporting device, wherein the image processing apparatus is configured to further perform:
   a judgment process for judging whether a piece of identification information is already associated with the piece of user information retrieved by the processor;
   a matching process for judging, in a case that it is judged in the judgment process that the identification information is already associated with the piece of user information retrieved by the processor, whether the identification information which is already associated with the user information retrieved by the processor matches the identification information read by the reading device; and
   a reporting process for controlling the reporting device to report that the identification information which is already associated with the user information retrieved by the processor does not match the identification information read by the reading device, in a case that it is judged in the matching process that the identification information which is already associated with the user information retrieved by the processor does not match the identification information read by the reading device.

7. The image processing apparatus according to claim 1, wherein each of the pieces of user information includes a piece of multiple-registration availability information indicating whether or not registration of a plurality of pieces of identification information is permitted, and
   the processor is configured to register the plurality of pieces of identification information successively in the registration process, in a case that the user information, which is associated with the identification information read by the reading device in the login process, includes the multiple-registration availability information indicating that the registration of the plurality of pieces of identification information is permitted.

8. An information processing method to be executed by an image processing apparatus provided with: an image processing device; a reading device configured to read identification information from an ID card; an operation device configured to accept an operation; a display unit configured to display information; a storage device configured to store a plurality of records, each record including a piece of user information; a processor; and a memory storing computer executable instructions to be executed by the processor, the information processing method comprising:
   making the image processing device available in a case that the identification information read by the reading device has been registered in the storage device,
   registering the identification information read from the ID card by the reading device in the storage device, comprising:
      retrieving one record including one piece of user information, for which registering the identification information has not been performed, from the storage device and displaying the one piece of user information on the display unit;
      in a case that the processor receives the identification information read from the ID card via the reading device while displaying the one piece of user information included in the one record on the display unit, registering the identification information read from the ID card into the one record in association with the one piece of user information displayed on the display unit;
      while the storage device stores another record including another piece of user information for which registering the identification information has not been performed, continuing registering the identification information for a remaining piece of user information for which registering the identification information has not been performed; and
      in a case that the storage device does not store another record including another piece of user information for which registering the identification information has not been performed, terminating the registering.

9. The information processing method according to claim 8, wherein in a case that two or more predetermined number of pieces of identification information are to be registered in the storage device, the operation is not accepted by the operation device after the identification information read by the reading device is registered in the storage device by the processor and until another piece of identification information is read by the reading device.

10. The information processing method according to claim 8,
   wherein the operation device is configured to accept a skip operation during registering the identification information for skipping a process for associating the piece of user information displayed on the display with the identification information read by the reading device in a state that the user information retrieved by the processor is displayed on the display, and
   in a case that the skipping operation is accepted by the operation device, a next piece of user information is retrieved by the processor without associating the piece of user information, which is retrieved by the processor and displayed on the display, with the identification information read by the reading device.

11. A non-transitory computer-readable storage medium storing computer-executable instructions that, when executed by a processor, cause an image processing apparatus, comprising: an image processing device; a reading device configured to read identification information from an ID card; an operation device configured to accept an operation; a display unit configured to display information; a storage device configured to store a plurality of records, each record including a piece of user information; and the processor, to perform:
   a login process for making the image processing device available in a case that the identification information read by the reading device has been registered in the storage device, and
   a registration process for registering the identification information read from the ID card by the reading device in the storage device, comprising:
      retrieving one record including one piece of user information, for which the registration process has not been performed, from the storage device and displaying the one piece of user information on the display unit;
      in a case that the processor receives the identification information read from the ID card via the reading device while displaying the one piece of user information included in the one record on the display unit, registering the identification information read from the ID card into the one record in association with the one piece of user information displayed on the display unit;
      while the storage device stores another record including another piece of user information for which the registration process has not been performed, continuing the registration process for a remaining piece of user information for which the registration process has not been performed; and in a case that the storage device does not store another record including another piece of user information for which the registration process in not performed, terminating the registration process.

12. The non-transitory computer-readable storage medium according to claim 11, wherein in a case that two or more predetermined number of pieces of identification information are to be registered in the registration process, the computer-executable instructions cause the operation device not to accept the operation after the processor registers the identification information read by the reading device in the storage device and until another piece of identification information is read by the reading device.

13. The non-transitory computer-readable storage medium according to claim 11,
   wherein the computer-executable instructions cause the operation device to accept a skip operation during the registration process for skipping a process for associating the piece of user information displayed on the display with the identification information read by the reading device in a state that the user information retrieved by the processor is displayed on the display, and
   in the registration process, the computer-executable instructions cause the processor to retrieve a next piece of user information without associating the piece of user information, which is retrieved by the processor and displayed on the display, with the identification information read by the reading device, in a case that the skipping operation is accepted by the operation device.

\* \* \* \* \*